US011120451B2

(12) United States Patent
Nelms et al.

(10) Patent No.: US 11,120,451 B2
(45) Date of Patent: *Sep. 14, 2021

(54) SYSTEM AND METHOD FOR MOBILE EXPRESS RETURN OF PRODUCTS

(71) Applicant: Walmart Apollo, LLC, Bentonville, AR (US)

(72) Inventors: David Martin Nelms, Rogers, AR (US); Bradley J. Kieffer, Rogers, AR (US); Brandon Flores, Mountain View, CA (US); Casey Huliberger, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/248,058

(22) Filed: Jan. 15, 2019

(65) Prior Publication Data

US 2019/0147444 A1   May 16, 2019

Related U.S. Application Data

(63) Continuation-in-part of application No. 16/145,893, filed on Sep. 28, 2018, now Pat. No. 10,990,981.

(Continued)

(51) Int. Cl.
*G06Q 20/40* (2012.01)
*G06Q 20/32* (2012.01)

(Continued)

(52) U.S. Cl.
CPC ....... *G06Q 20/407* (2013.01); *G06F 16/9554* (2019.01); *G06Q 20/047* (2020.05);
(Continued)

(58) Field of Classification Search
CPC .......................... G06Q 20/407; G06F 16/9554
(Continued)

(56) References Cited

U.S. PATENT DOCUMENTS

| 8,156,007 | B1 | 4/2012 | Anthony et al. |
| 8,676,653 | B2 * | 3/2014 | Argue ................. G06Q 20/047 705/17 |

(Continued)

OTHER PUBLICATIONS

Neil Nisperos, How to return a holiday gift bought online, Dec. 25, 2016, Inland Valley Daily Bulletin, Ontario, Califormia, Los Angeles Newspaper Group, 3 pages / Dec. 25, 2016. (Year: 2016).*

(Continued)

*Primary Examiner* — Benjamin S Brindley
(74) *Attorney, Agent, or Firm* — Duane Morris LLP; Manita Rawat

(57) ABSTRACT

Systems and methods for mobile-initiated in-store return of products are provided. An example system can include: an Order Management Module (OMM) configured to store in a first database completed transactions and associated electronic receipts for customers; a mobile device having a mobile application installed thereon and configured to query and receive from the OMM selection of products for return; a Return Management Module (RMM) configured to apply rules to validate the return based on the information about the selected product; and a return station configured to verify and complete the return.

16 Claims, 5 Drawing Sheets

Related U.S. Application Data

(60) Provisional application No. 62/565,742, filed on Sep. 29, 2017.

(51) Int. Cl.
*G06F 16/955* (2019.01)
*G06Q 20/38* (2012.01)
*G07F 7/06* (2006.01)
*G06Q 20/04* (2012.01)

(52) U.S. Cl.
CPC ....... *G06Q 20/3276* (2013.01); *G06Q 20/389* (2013.01); *G07F 7/06* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 9,015,070 | B2* | 4/2015 | Grigg | G06Q 20/3276 705/28 |
| 9,692,738 | B1 | 6/2017 | Wenneman et al. | |
| 10,002,341 | B2* | 6/2018 | Schenken | G06Q 10/087 |
| 10,430,753 | B2* | 10/2019 | Felix | G06Q 20/00 |
| 2009/0271265 | A1 | 10/2009 | Lay et al. | |
| 2015/0066752 | A1* | 3/2015 | Phillips | G06Q 20/22 705/40 |
| 2015/0186841 | A1* | 7/2015 | Sar | G06Q 10/0837 705/304 |
| 2015/0254666 | A1* | 9/2015 | Agasti | G06Q 20/322 705/39 |
| 2016/0042351 | A1* | 2/2016 | Syed | H04W 4/021 705/39 |
| 2016/0132891 | A1* | 5/2016 | MacKinnon Keith | G06Q 20/385 705/44 |
| 2016/0350757 | A1* | 12/2016 | Bolling | G06Q 20/202 |
| 2018/0114228 | A1* | 4/2018 | Singh | G07F 7/06 |
| 2018/0349846 | A1* | 12/2018 | Sever | G06K 7/10861 |

OTHER PUBLICATIONS

Non-Final Office Action dated Jun. 11, 2019, issued in co-pending U.S. Appl. No. 16/145,893.

* cited by examiner

SYSTEM AND METHOD FOR MOBILE EXPRESS RETURN OF PRODUCTS

CROSS REFERENCE TO RELATED APPLICATION

This patent application is a continuation-in-part of U.S. patent application Ser. No. 16/145,893, filed on Sep. 28, 2018, which claims priority benefit to U.S. Provisional Application No. 62/565,742, filed on Sep. 29, 2017, contents of both are incorporated by reference herein.

BACKGROUND

1. Technical Field

The present disclosure relates to return of products in stores. More specifically, the present disclosure relates to systems and methods for mobile express return of products based on customer identifications and electronic receipts.

2. Introduction

For retail stores who also offer online shopping, customers can purchase products both from the stores and online. However, when return of products arises, customers are usually required to bring the products to the stores for the return. One of the issues associated with in-store return of product is long waiting lines at customer service desks in stores, in addition to reviewing and presenting receipts for the products. This increases store operational costs and reduces customer's satisfaction as well. Further, a computer system at the customer service desk is equipped with a scanner to scan the receipts of the products, which may increase the cost of the computer system and also increase complexity of the software of the computer system for handling product returns.

What is needed are systems and methods for efficiently facilitating return of products in stores, and for reducing the cost of the computer system and the complexity of the software for product returns.

SUMMARY

Disclosed herein are systems for mobile-initiated in-store return of products via a mobile application based on customer identifications and electronic receipts associated with the products, which overcome at least some drawbacks known in the art. An example system for mobile-initiated in-store return of products can include an order management module (OMM). The OMM is configured to: store completed transactions and associated electronic receipts for customers in a first database; and store pending transactions for the customers in the first database. The example system can also include a mobile device having a mobile application installed thereon. The mobile device is configured to: scan a code of a product to be returned, query the OMM based on the scanning of the code of the product to identify electronic receipt for the product to be returned; receive from the OMM the electronic receipt of the product for return, based on the query. The example system can further include a return management module (RMM). The RMM is configured to: apply rules to validate the return based on the electronic receipt about the scanned product; send an update to the OMM to set a flag with the scanned product indicating that the return is staged; and store information about the return in a second database. The example system can also include a return station. The return station is configured to: verify the customer by communicating with the mobile device; query the OMM for products with flags; filter the flags to locate the scanned product. The example system can further include a remote return service server (RRSS). The RRSS is configured to: retrieve the information about the return from RMM; and send the information about the return to the return station.

Another exemplary system for mobile-initiated in-store return of a purchased item through a mobile application based on scanning a code of the purchased item and an electronic receipt associated with the purchased item. The exemplary system can include a portable device having the mobile application installed thereon. The portable device is configured to: launch the mobile application based on a customer identification; scan, via the mobile application, the code of the purchased item for the in-store return; receive from a first database, via the mobile application, the electronic receipt of the purchased item, based on the scanned code; associate, via the mobile application, the electronic receipt with the purchased item; generate from a second database, via the mobile application, validating information associated with the in-store return; save, via the mobile application, return information to the second database, the return information including at least one of the purchased item, the electronic receipt, or the validating information; and direct, via the mobile application, a customer associated with the customer identification to a return location in a store. The exemplary system can also include a return station (self-service or assisted) positioned in the return location in the store. The return station is configured to pair with the portable device; receive the return information; print a return label to be placed on the purchased item; and receive the labeled purchased item. The exemplary system can further include a computing device associated with the first database. The computing device is configured to: receive an input indicative of receipt of the labeled purchased item; and update the first database to indicate that the labeled purchased item is received. The portable device is further configured to: receive, after updating the first database, a first notification indicating that the in-store return is being processed; and receive, after the in-store return is finished, a second notification indicating that the in-store return has been completed.

Another system of returning a product based on scanning a code of the product is provided. The system is configured to: receive the scanned code information of the product; retrieve electronic receipt of the product, based on the scanned code information; apply rules to validate the return about the product, based on the electronic receipt; flag the return of the product indicating that the return is staged, based on the applied rules; verify presence of the product at a store for return, by communicating with a mobile device used for scanning the code; print a label to be placed on the product; and refund the product to an account associated with the product.

A method implemented by a computer system for a mobile-initiated in-store return of a purchased item through a mobile application based on scanning a code of the product and an electronic receipt associated with the purchased item is provided in this disclosure. The computer system can include a portable device having the mobile application installed thereon, a return station (self-service or assisted) positioned in a return location in a store and, and a computing device. The method can include: launching the mobile application based on the customer identification; scanning, via the mobile application, the code of the purchased items for the return; receiving from the first database, via the mobile application, the electronic receipt of the purchased item; generating from a second database, via the mobile application, validating information associated with the in-store return; saving return information to the second database, the return information including at least one of the purchased item, the electronic receipt, or the validating information; directing, via the mobile application, a customer associated with the customer identification to the return location in the store; pairing the portable device with the return station; receiving, by the return station, the return information; printing, by the return station, a return label to be placed on the purchased item; receiving, by the return station, the labeled purchased item; receiving, by the computing device, an input indicative of receipt of the labeled purchased item; updating the first database to indicate that the labeled purchased item is received; receiving by the portable device, after updating the first database, a first notification indicating that the in-store return is being processed; and receiving by the portable device, after the in-store return is finished, a second notification indicating that the in-store return has been completed.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limited in the figures of the accompanying drawings, in which like references indicate similar elements and in which.

DETAILED DESCRIPTION

Figure 1:
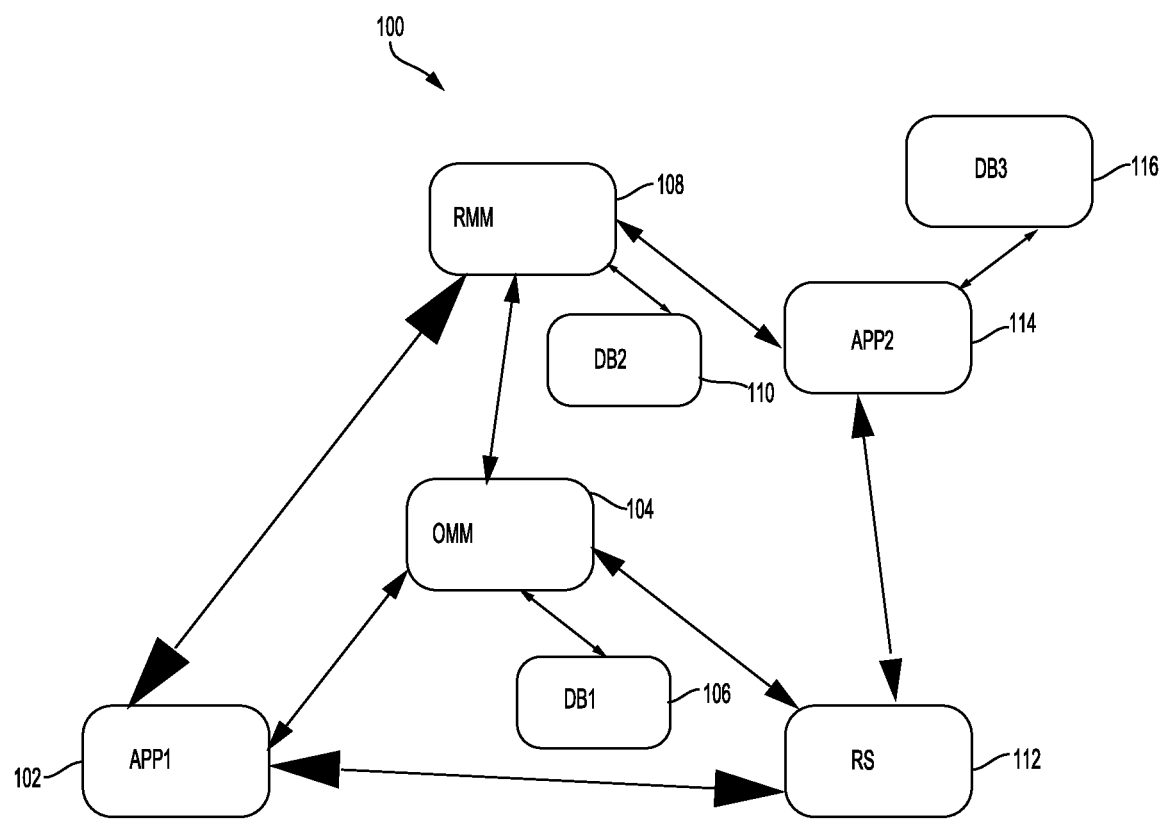
FIG. 1 illustrates a system for mobile-initiated express return of products according to one example embodiment.

Various configurations and embodiments of the disclosure are described in detail below. While specific implementations are described, it should be understood that this is done for illustration purposes only. Other components and configurations may be used without parting from the spirit and scope of the disclosure.

The concepts and embodiments described herein are provided to facilitate in-store return of products/items. Current computer systems and databases store customer transactions, identification, purchase history, and store inventory in different data stores. The information in the data stores is not associated with each other. It is difficult and inefficient for the computer system to locate and validate the information when processing a return. This leads to slow response times and delays in processing transactions. Embodiments of the invention improves processing times, allowing more transactions to be processed, and more terminals to access the system.

A mobile application based on customer/customer identifications is used to facilitate locating electronic receipts associated with the products. The mobile application is configured with a method for identity confirmation and receiving electronic receipts. As used herein, the terms "product" and "item" are interchangeable and all refer to goods purchased by customers.

The system disclosed herein can initiate a product return before a customer arrives at a store. The system can scan the universal product code (UPC) or any other code of the product and pull up the receipt for that product to stage the return. Once the product is carried into the store, a self-service kiosk that may be located in the customer service area, can be approached. The system with a mobile device may scan codes, such as a quick response (QR) code, displayed on the kiosk to associate the prepared return transaction with the kiosk. After the mobile device is connected with the kiosk, the system may print a label to be placed on the return product. The system may further instruct which bin of the kiosk to place the product within. Rules may determine when the customer's account can receive credit from the return transaction.

In some processes, a product return may involve a customer logging into a retailer's mobile application to identify the purchase history of the customer. The system may locate from the purchase history a transaction with a product the customer wants to return. The system may select the item, state why returning the item, and create a record for the return. However, similar items may be improperly selected by the system in the purchase history. By scanning a UPC of a product to be returned, the system may associate the item with the purchase history of the customer. This may also facilitate a retailer in ensuring that the correct item is being returned.

In some embodiments, the kiosk may allow for a product return transaction to take place at the store, in lieu of customer service desk, or at self-checkout location. The system scans the item barcode. The system may print a piece of paper, and attach the printed paper to the item. This process may be applied to a customer/item who is known to have a good combination of trust and risk for the item in question. As such, no other verification may be involved.

In some embodiments, there is a code, such as a QR code displayed on the screen of the kiosk once the item to be returned is displayed. The system scans the QR code via a mobile phone. The return information may be cycled through the system, through a network and back to returns service host software. The customer and the item may be confirmed as the identified person and identified item at the same place.

At the kiosk, the steps may be performed as follows. The system takes a picture with the mobile phone of kiosk-specific QR code displayed at kiosk. That picture may identify the customer and locate the customer at a specific location. A mobile application may allow an authenticated ID (e.g., an email account) of the customer to be sent to the returns service host software, along with the information (e.g., customer name) on the customer returning the item. The system determines the identity of the customer and may look at their staged return in a returns pending database. If there are more than one returns listed, a prompt may be made asking the customer to identify which return is occurring.

After the customer indicates which return, or if there is only one return, a label may be printed for the returns center to process the return. Alternatively, a label may be tied to the customer transaction. That is, the label may be further processed (e.g., digitalized) to be sent to the returns service host software that associates the label with the transaction. When the label is tied to the transaction, the item may be resold without sending the item to the return center if the item is resellable. The system can automatically add the item to the inventory database, allowing a sale of the item to be processed quicker in real time. The system may further determine which label is applied circumventing further inspection of the item. The system may supply a return center label, a markdown label, or a throwaway label—whichever applies to the specific return in question.

In some embodiments, the system may include cameras for the kiosk to identify fraud (e.g., verify who the customer is when returning the item), as some items may be left in the returns bins of the kiosk for a longer period of time. When the customer has a known ID that can be authenticated via the returns service host software, fraud may be less of a concern.

In some embodiments, release of refund payment to the customer's account may occur only after an audit of the return, which confirms what the item is. Alternatively, if a customer is known to conduct a great deal of business with the retailer (e.g., by checking transaction history of the customer), and the item is a low risk item (e.g., the item is less than $20), the return of funds may be posted sooner, for example, immediately.

In some embodiments, the system and method disclosed herein may be applied to product exchanges. When a customer drops off one item, a credit for that item may be kept, for example, not posted to credit account or money account. The credit may be for the monetary value of the item, or an "item" credit. This credit may be similar to certain gift card products that are to be used for specific items. Alternatively, a return may be put on hold, and when a new item is purchased, the return is cancelled.

In some embodiments, another level of authentication may be used to authenticate the identity of product return. For example, two independent third-party sources of information may be used to determine actions regarding the product return, and verify the account owner's identity to build a trust model for the customer. The first source may be a financial credit/services data provider. The second source may be a provider which tracks personal email accounts to popular sites, such as social media. When the customer signs up for their retailer account and provides an email account, the system may use third-party data to verify that this name and email combination have been used for a longer period of time (e.g., four years) by this person.

FIG. 1 illustrates an example system 100 for mobile-initiated express return of products. The system 100 comprises a first computing device 102 having a software application (i.e., APP1) installed thereon. The first computing device 102 may be a smart phone, a computing tablet, a laptop computer, a desktop computer, or any other portable device. The APP1 may be a mobile application configured for online shopping by a customer. The customer may launch the APP1 by using a customer identification and a password, and review and receive electronic receipts associated with the customer's online transactions via the APP1.

In some embodiments, the first computing device 102 may further be configured to digitalize a paper copy of transaction receipt by converting the paper receipt to a corresponding electronic receipt, and to associate the corresponding electronic receipt with products in that transaction. For example, in a situation where a transaction is completed in a store and the customer is issued a paper receipt for products in that transaction, by launching the APP1 using the customer identification and password, the paper receipt may be scanned or photographed and then further processed via the APP1 to associate the converted electronic receipt with the products in that transaction occurred in stores.

When a customer returns a product, the first computing device 102 may be further configured to scan UPC of the product and pull up the receipt for that product from the purchase history of the customer.

The system 100 can comprise an order management module (OMM) 104. The OMM 104 is configured to store in a first database (DB1) 106 completed transactions and associated electronic receipts for customers under customer's accounts (customer identifications and passwords) set up via the APP1. The OMM 104 can further be configured to store in the first database 106 pending transactions associated with the customers' accounts. The OMM 104 may embody any suitable computing hardware combined with software applications. For example, the OMM 104 may include, but is not limited to, a desktop computer, a laptop computer, or a mainframe, on which operating systems and application software are run to implement functions of the OMM 104.

When a customer wants to return a product, the customer can launch the APP1 on the first computing device 102 by logging in to his/her account. The first computing device 102 can query via the APP1 the OMM 104 for transactions associated with the customer's account, and receive a selection of the product to be returned. Specifically, the customer may be presented a listing of products in completed and pending transactions list associated with the customer's account, for example, a dropdown listing, a table, or a spreadsheet. The customer may then select or determine one or more products he/she wants to return, for example, by clicking on the one or more products. The first computing device 102 may receive from OMM 104 information on the selected product to be returned, such as the electronic receipt associated with the selected product, date and time of purchase, location of purchase, a payment method (e.g., credit card, check, gift card, debit card, or cash), or the like. The communication between the first computing device 102 and the OMM 104 can be any suitable communications channel, for example, a WIFI network, a wired network, a Bluetooth link, or the like.

In some embodiments, after logging in to the customer's account, the first computing device 102 may be used to scan the UPC of the product to be returned, instead of selecting the product to be returned from the purchase history of the customer. In this case, upon scanning the UPC, the electronic receipt associated with the product, date and time of purchase, location of purchase, a payment method (e.g., credit card, check, gift card, debit card, or cash), or the like, can be automatically retrieved, without selection by the customer, from the purchase history of the customer that is stored on the first database 106. In addition to the log-in information of the customer, another level of authentication may further be used to authenticate who is in the transaction of product return, as described as above. For example, an email address of the customer may further be requested, such that the provided email address can be verified with an email address stored in the customer profile.

The system 100 can also include a return management module (RMM) 108. The RMM 108 is configured to communicate with the first computing device 102. The communication between the first computing device 102 and the RMM 108 can be any suitable communications channel, for example, a WIFI network, a wired network, a Bluetooth link, or the like. The RMM 108 may apply return rules/policy to validate the return eligibility based on the information about the selected product. The rules may include, but are not limited to, "food is not eligible for return", "electronic device is invalid for return after 30 days from the date of purchasing", "no return for items is allowed beyond 90 days from the date of purchasing", or the like. That is, validating return information about the return can be generated. The validating information may include the selected product, the UPC of the product, the electronic receipt, a reason for the return and/or a refund method (e.g., refund to credit card, refund as a gift card, refund to a bank account, etc.) The validating information may be further stored in a second database DB2 110. The RMM 108 may further be configured to send an update to the OMM 104 to flag the entry of the product in the first database DB1 106 to indicate that the product has been staged for return. The communication between the OMM 104 and the RMM 108 can be any suitable communications channel, for example, a WIFI network, a wired network, a Bluetooth link, or the like.

The RMM 108 may embody any suitable computing hardware combining with software applications. For example, the RMM 108 may include, but is not limited to, a desktop computer, a laptop computer, or a mainframe, on which operating systems and application software are run to implement functions of the RMM 108.

The system 100 can further include a return station (RS) 112 located in a return location in a store. After staging the return, the customer may bring the selected product to the store for return. Upon arriving at the store, the customer can be directed, via the APP1 on the first computing device 102 carried with the customer, to the return location where the RS 112 is placed. For example, the APP1 may detect a global positing system (GPS) position of the first computing device 102, or a network connection by the first computing device 102 to a local WIFI network in the store. Such detection can signal that the customer has arrived in the store, and a notification is sent to the first computing device 102 to direct the customer to the return location. The return station may be a kiosk.

The RS 112 may be further configured to pair with the first computing device 102. Upon arrival at the RS 112, the customer may pair the first computing device 102 with the RS 112, for example by scanning a quick response (QR) code displayed on the RS 112. The paring may also be performed via a near field communication, a WIFI network, or a Bluetooth link between the first computing device 102 and the RS 112. Once being paired, the RS 112 is configured to verify the customer identification. After a connection is established between the RS 112 and the device 102, information regarding the customer and UPC of the product may be cycled through the system 100 to the OMM 104 and RMM 108. This information may be compared and verified by the OMM 104 and RMM 108, such that the customer and the item may be confirmed as the identified person and identified item at the same place.

When the customer identification is verified, the RS 112 may further query the OMM 104 for products with flags associated with the customer identification. The RS 112 may further apply a flag filter to locate the selected products for the return from among the other flags set for the customer.

The RS 112 may embody any suitable computing hardware combining with software applications. For example, the RS 112 may include, but is not limited to, a desktop computer, a laptop computer, or a mainframe, on which operating systems and application software are run to implement functions of the RS 112. The RS 112 may also be in a form of a kiosk, a point of sale (POS), or a point of customer service (POCS). The communication between the OMM 104 and the RS 112 can be any suitable communications channel, for example, a WIFI network, a wired network, a Bluetooth link, or the like.

The system 100 may further comprise a remote return service server (RRSS) 114 running an application APP2 and connecting to a third database DB3 116. The RRSS 114 can be configured to retrieve the information about the return from the RMM 108, and send the information about the return to the RRSS 114. The DB3 116 may store sales, inventory, customer financial information, customer names, customer addresses, and the like.

The RRSS 114 may embody any suitable computing hardware and/or software applications. For example, the RRSS 114 may include, but is not limited to, a desktop computer, a laptop computer, or a mainframe, on which operating systems and application software are run to implement functions of the RRSS 114. The RRSS 114 may also embody a cloud-based module, which can be accessed from the Internet using any Internet browser. The communication between the RMM 108 and the RRSS 114 can be any suitable communications channel, for example, a WIFI network, a wired network, a wide area network, a Bluetooth link, or the like. Similarly, the communication between the RS 112 and the RRSS 114 can be any suitable communications channel, for example, a WIFI network, a wired network, a wide area network, a Bluetooth link, or the like.

In some embodiments, the RS 112 may be configured to receive the return information about the selected product or the UPC-scanned product from the first computing device 102. For example, after paring with the RS 112, the first computing device 102 may transfer the return information to the RS 112. The RS 112 may also receive the return information directly from the RMM 108.

The RS 112 may further be configured to print out a return label to be placed by the customer on the returned product. For example, once the customer identification is verified and the return information is confirmed, a return label may be printed out so the customer can place the label on the returned product. The RS 112 may also have features to receive the labeled product. For example, the RS 112 may be configured to have one or more receiving box or cabinet so the customer can drop the labeled product in the receiving box or cabinet.

In some embodiments, a label may be tied to the customer transaction. As used herein, "tie" may indicate that the label may be further processed instead of being placed on the product. For example, the label may be digitalized and associated with the product transaction via the OMM 104 and RMM 108. In some cases, the "tie" may indicate that a notification as a virtual label is associated with the product transaction via the OMM 104 and RMM 108. For example, the notification may be "this product has been returned, but is resellable." When the label is tied to the transaction, the item may be resold without sending to the return center if the item is resellable. The system 100 may further include some logic to determine which label is applied circumventing further inspection of the item. In addition to a return label, a markdown label, or a throwaway label may be printed to accommodate the specific return in question.

In some embodiments, the RS 112 may receive from the RMM 108 returning information for an additional product to be returned that was staged previously and validate against the return rules or policy the returning information for the additional product for return eligibility. For example, the customer may select two products for return when coming to the store. One of the selected products may be staged for return a quite long time ago. At the time when this product was staged, the product was eligible for return. However, the customer may forget to bring the product to the store for timely return. So for this additional product, the RS 112 retrieves the previously staged return information and validates the return information against the rules to check if this additional product is still be eligible for return.

In some embodiments, the RS 112 may be configured to have a customer stage onsite a product for return. For example, the customer may not have enough time to stage the product for return before coming to the store for the return. In this scenario, the RS 112 may allow the customer to generate return information onsite. For example, upon verifying the customer identification of the customer, the RS 112 may present a listing of products associated with the customer identification for the customer to select which product to return. The listing of products is received from the OMM 104. The customer selects a product for return from the listing, and the RS 112 is further configured to validate the return by applying the rules for return eligibility via communicating with the RMM 108. The customer may also scan onsite the UPC of the product to directly pull out the information of the product from the purchase history of the customer.

In some embodiments, the RS 112 may further configured to issue a refund for the returned product to a financial account associated with the customer identification. The financial account may be saved on the DB3 116.

In some embodiments, release of refund payment to the customer's account may occur only after an audit of the return. As used herein, the "audit" may include confirming: what the customer returned is the product as claimed by the customer, the payment method the customer used when purchasing the product, the customer's name and address, whether or not the product has been damaged, etc.

Alternatively, if a customer is known to conduct a great deal of business with the retailer, and the item is a low risk item, the return of funds may be posted sooner, for example, immediately. For example, by examining the purchase history of the customer, the customer may be identified as a customer who conducted a large amount of business with the retailer, such that the customer may be rated as a trustable customer. The low risk item may also include an item that is not damaged easily or is below a price threshold.

In some embodiments, the system 100 may be applied to product exchanges. When a customer drops off one item, a credit for that item may be kept, for example, not posted to credit account or money account. The credit may be for the monetary value of the item, or an "item" credit. This credit may be similar to certain gift card products that are to be used for specific items. Alternatively, a return may be put on hold, and when a new item is purchased, the return is cancelled.

In some embodiments, the system 100 may further comprise a second computing device (not shown in FIG. 1). The second computing device can be configured to communicate with the OMM 104, and may embody any suitable computing hardware and/or software applications. For example, the second computing device may include, but is not limited to, a smart phone, a computing tablet, a desktop computer, a laptop computer, or a mainframe, on which operating systems and application software are run to implement functions of the second computing device. The communication between the OMM 104 and the second computing device can be any suitable communications channel, for example, a WIFI network, a wired network, a wide area network, a Bluetooth link, or the like.

In some embodiments, the second computing device may be implemented as the RS 112. Alternatively, the second computing device may be a standalone device separate from the RS 112.

The second computing device can be configured to receive an input indicative of receipt of the labeled product. For example, after the customer labels the returned product and leaves it in the return location, a store associate may pick it up and update it in the DB1 106 as received.

The customer may further receive on the first computing device 102 a first notification indicating that the in-store return is being processed after updating the DB1 106. The first notification may be sent out by the RMM 108 or the RS 112.

Further, the customer may receive on the first computing device 102 a second notification indicating the in-store return has been completed and/or the refund has been processed, when the return is finalized. The second notification may be sent out by the RMM 108 or the RS 112. Accordingly, the flags associated with the returned products are removed from the DB1 106.

Figure 2:
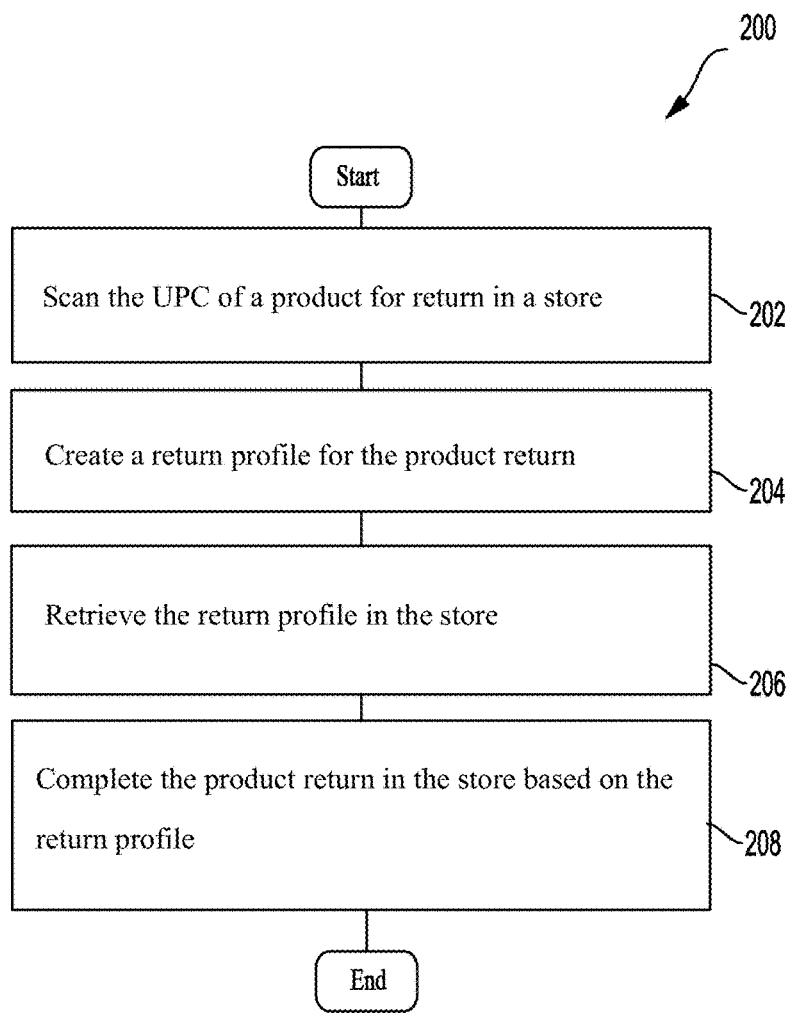
FIG. 2 illustrates a method for mobile-initiated express return of products according to one example embodiment.

FIG. 2 shows a flow chart of a method 200 for mobile-initiated express return of products according to one example embodiment. The method 200 may be implemented in the system 100 shown in FIG. 1.

In step 202, the UPC of a product to be returned is scanned. The customer may use his mobile device having a mobile application installed thereon, such as a mobile phone, a computing tablet, or a laptop computer. The mobile application can be an online shopping application. By logging into the mobile application using account information of the customer (e.g., a customer username and password), the customer may be identified. The customer may use his mobile phone to scan the UPC of the product. Once the UPC of the product is scanned, transaction information of the product can be automatically retrieved from the purchase history of the customer, without selection of the customer of which product from the purchase history. The customer identification is associated with the transactions of the customer. The code of the scanned product is matched with a product purchase in the customer history. The customer may further be authenticated to verify who is in the return transaction. The further authentication may be performed using a two-level authentication approach as described above. For example, in addition to the customer username and password, the customer may further be asked to provide an email address of the customer, to answer one or more security questions, to type in a one-time code generated by the mobile application, provide biometric information of the customer, etc. In some embodiments, instead of scanning the UPC of the product, the method may select one or more products to be returned from a listing of products associated with the customer's account. For example, the customer may navigate to a "return" section of the mobile application, such as a "return" icon or tab. Once the "return" section is activated, the customer can access a listing of completed and pending transactions associated with his account, from which the customer is allowed to select one or more products for the return. The mobile application automatically associates the selected products with the corresponding electronic receipts.

In step 204, a return profile is created for the selected product. The return profile may include name of the selected product, purchase date, purchase time, purchase location, eligibility of the return against business rules or policy, the reason for the return, a refund method, and/or the like. The return profile may also referred to as return information of the return, and may be generated prior to the actual occurrence of the return in a store or during the actual occurrence of the return in the store. Further, the return profile may be stored on a database, such as DB2 110 in FIG. 1.

In step 206, the return profile is retrieved in the store. When the customer comes to the store to return the selected product, the return profile can be retrieved, for example by the RS 112 from the DB2 110 via RMM 108. The return profile may be further validated against the business rule and/or policy in the store. The customer may use his mobile phone to scan a QR code displayed on the kiosk to establish a connection between the mobile phone and the kiosk. The connection can be any suitable connection, for example, a Bluetooth connection, a near field connection, a WIFI connection, etc. Once the connection is established, the customer may be confirmed to be at the kiosk for the product return.

In step 208, the return is completed in the store based on the return profile. Once the return profile is verified, the return is processed and completed. The refund may be paid according to the refund method and policy set forth in the return profile. The refund policy may include: 1) release of refund payment to the customer's account may occur only after an audit of the return, which confirms what the item is; and 2) if a customer is known to conduct a great deal of business with the retailer, and the item is a low risk item, the return of funds may be posted sooner, for example, immediately.

Figure 3:
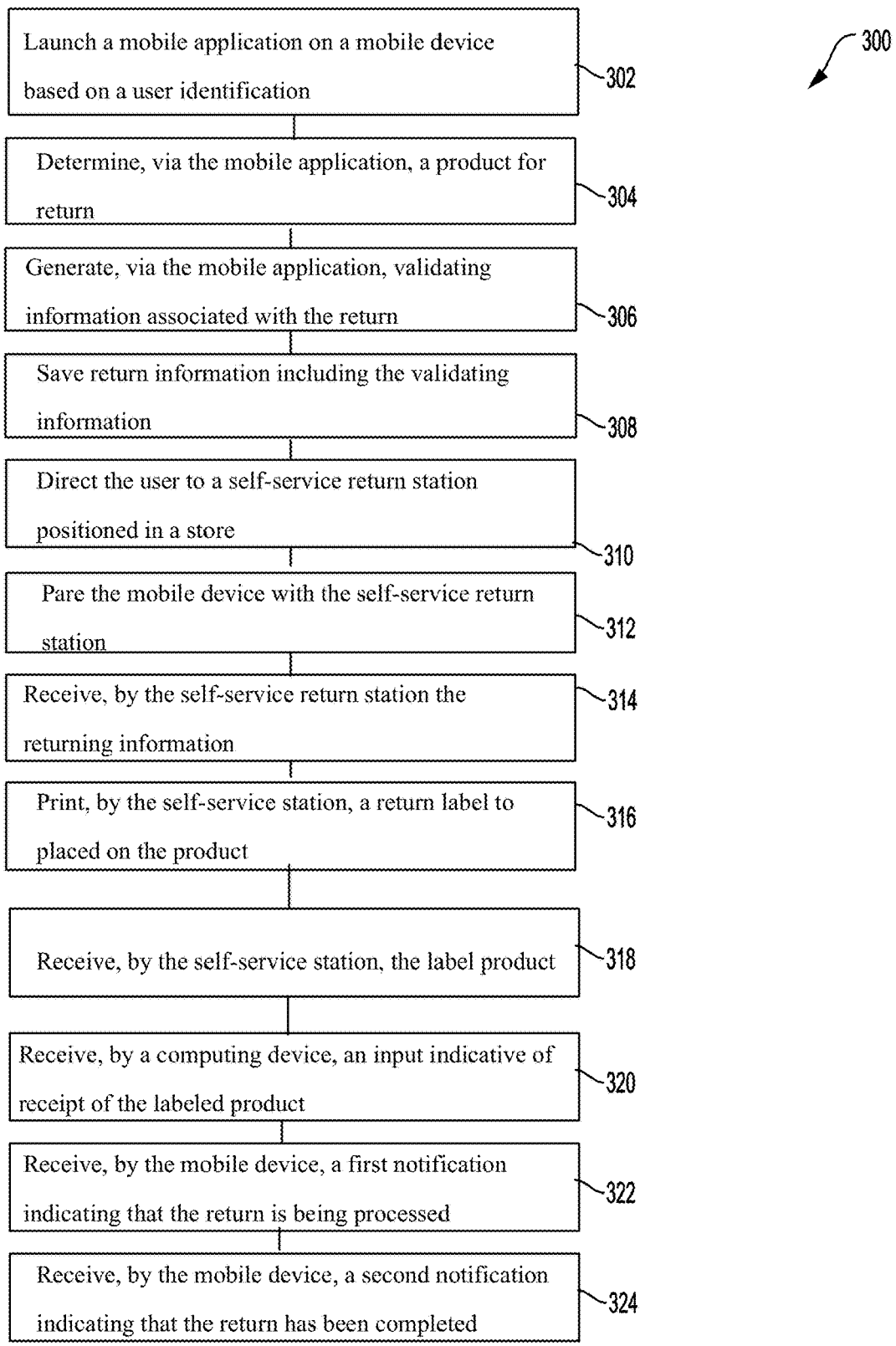
FIG. 3 illustrates a method for mobile-initiated express return of products according to another example embodiment.

FIG. 3 shows a flow chart of a method 300 for mobile-initiated express return of products according to one example embodiment. The method 300 may be implemented in the system 100 shown in FIG. 1.

In step 302, a mobile application is launched by a customer on a mobile device using a customer identification. The customer identification may be a customer email, a customer account name, a customer password, or a combination thereof. The customer identification may be authenticated by levels of authentication as described above. The mobile device may include, but is not limited to, a smart phone, a computing tablet, or a laptop computer. The customer can use the mobile application to conduct online and/or in-store shopping such that electronic receipts are automatically associated with the customer's transactions and stored into the customer's account in such as DB1 106 of FIG. 1. When the customer shops in a store without using the mobile application, electronic receipts can be generated via the mobile application by scanning or photographing corresponding paper receipts, and then associate with the in-store transactions. All the online and in-store transactions and associated electronic receipts can be stored in the DB1 106.

In step 304, a product for return may be determined via the mobile application. Once logging into the mobile application, the product may be determined by scanning the UPC of the product with the mobile device. The electronic receipt of the product can be automatically pulled out from the purchase history of the customer, based on the scanned UPC information. Further, in the mobile application, the customer can navigate to a return portion of the mobile application for selecting more products to return. Upon activating the return portion, for example by clicking on a return icon or tab, a list of items from all transactions associated with the customer's account is pulled out from the DB1 106 and shown to the customer for selection. The list may be displayed as a drop-down listing, a table, or a spread sheet. The list may further be filtered by the OMM 104 or the mobile application for return eligibility according to filtering criteria. For example, only items purchased one week ago are provided. The customer may configure the filtering criteria, such as "items purchased within one week", "items purchased with one month", "electronic items", "food items", "and items less than $500", and the like. The OMM 104 may only provide items that are eligible for return. For example, food items may not be displayed to the customer because according to return rules and/or policy, food items are not allowed to be returned.

In some embodiments, upon activating the return portion, the customer is provided a search field in the mobile application where the customer can search for products to be returned. For example, the customer may enter key words in a search bar, such as "food" or "electronic" to search for the products. The customer may also enter receipt numbers in the search bar to search for the products.

The customer can select one or more products for return from return-eligible items provided in the return portion. That is, available purchased items for return are determined.

In step 306, validating information for the return is generated. Once the items for the return are determined by the customer, the customer may be further asked to provide some validating information via the mobile application, such as a reason for the return, what kind of refund method the customer prefers, or the like. The refund method may include returning the refund back to the payment method, showing the refund as credit in the customer's account, adding the refund to a gift card, depositing the refund to a bank account, and so forth.

In step 308, information about the return, referred to as return information herein, is saved via the mobile application to the customer's account in, for example, the DB2 110. The return information can include the validating information, name of the selected item, purchase date and time of the selected item, purchase location of the selected item, and so on.

In some embodiments, the determined items may be updated with flags to indicate that the selected items are staged for an in-store return. The update may be performed by the RMM 108 and the OMM 104 as shown in FIG. 1.

In step 310, the customer is directed via the mobile application to a return location in a store for the in-store return of the selected items, where a return station (e.g., the RS 112) is positioned. The return station may be a self-service kiosk. After staging the return of the selected items, which can be performed anywhere as long as the customer can access the mobile application, the customer can bring the selected items to a store. Upon detecting the presence of the customer in the store, the customer can be directed to the return location in the store. For example, a GPS position of the portable device carried by the customer is detected via the mobile application to indicate that the customer enters the store. The presence of the customer in the store can also be detected through a WIFI connection by the mobile device to a local WIFI network in the store. The direction to the return station may be instructed via a push notification received by the mobile device from the RS 112, the RMM 108, or the OMM 104 when the presence of the customer in the store is detected.

In step 312, the portable device is paired with the return station. When the customer arrives at the return location and approaches the return station, the customer can pair the mobile device via the mobile application with the return station. In some cases, the customer may launch the mobile application, if not, prior to the pairing. The pairing between the mobile device and the return station can be performed by, for example the local WIFI network in the store, a near field communication (NFC), or a Bluetooth communication, or by scanning a QR code on the return station. The customer is verified by the return station via the pairing to be a known customer with the correct return products In step 314, the return station can receive the return information of the selected item. As described above, the return information is stored in the DB2 110. The return information may be transferred by the mobile device via the mobile application to the return station. The return information may also directly be retrieved by the return station from the DB2 110 via the RMM 108. The return information may also be received from a remote server (e.g., the server 114) who communicates with the RMM 108.

In step 316, a return label is printed out by the return station. Once the return station receives and verifies the returning information, the return station automatically prints a return label for the customer to place it on the selected item.

In some embodiments, a label may be tied to the customer transaction. When the label is tied to the transaction, the item may be resold without sending to the return center if the item is resellable. The term "tie" may indicate that the label may be further processed instead of being placed on the product. For example, the label may be digitalized and associated with the product transaction via the OMM 104 and RMM 108. In some cases, the "tie" may indicate that a notification as a virtual label is associated with the product transaction via the OMM 104 and RMM 108. For example, the notification may be "this product has been returned, but is resellable." Thus, the method 300 may further include tying the label to the customer transaction. The method 300 may further include some logic to determine which label is applied circumventing further inspection of the item. In addition to a return label, a markdown label, or a throwaway label may be printed to accommodate the specific return in question.

In step 318, the labeled item is received by the return station. After labeling the item, the customer may drop the labeled item into a receiving box or cabinet of the return station. The labeled item may also be placed in an area in close proximity to the return station, for example, a shelf, a cabinet, or a table positioned by the return station.

In some embodiments, the method 300 may further include a step 320. In step 320, an input is received by an additional computing device to indicate that the labeled item is received for the return. After the labeled item being placed in the return location, a store associate may come to the return location to check, and input on the computing device to indicate that the labeled item is received. And accordingly, the DB1 106 is updated to reflect that the selected items have been received in the store for the return. The additional computing device can be a standalone device separate from the device 102, the OMM 104, the RMM 108, the RS 112, and the remote server 114, or can be any one of the OMM 104, the RMM 108, the RS 112, and the remote server 114 or part thereof.

In step 322, a notification is received by the customer on the mobile device indicating that the in-store return is being processed. Upon updating the DB1 106, the OMM 104, the RMM 108, or the RS 112 may send out the notification to the customer's portable mobile device to notify the customer of the return processing status.

Further, in step 324, an additional notification may be received by the customer on the mobile device indicating that the in-store return is completed. Upon completing the return, the OMM 104, the RMM 108, or the RS 112 may send out the additional notification to the customer's portable device to notify the customer of the completion of the return.

In some embodiments, the OMM 104, the RMM 108, or the RS 112 may further issue the refund for the return according to the refund method specified by the customer.

In some embodiments, release of refund payment to the customer's account may occur only after an audit of the return. As used herein, the "audit" may include confirming: what the customer returned is the product as claimed by the customer, the payment method the customer used when purchasing the product, the customer's name and address, whether or not the product has been damaged, etc. If a customer is known to conduct a great deal of business with the retailer, and the item is a low risk item, the return of funds may be posted sooner, for example, immediately. For example, by examining the purchase history of the customer, the customer may be identified as a customer who conducted a large amount of business with the retailer, such that the customer may be rated as a trustable customer. The low risk item may include an item that is not damaged easily, an item that is less than a certain value (e.g., $30), etc.

In some embodiments, the return station may further receive return information for an additional item to be returned along with the selected item. The return information for the additional item was staged previously for the additional item, but the customer may forget to return the additional item timely. In such case, the return station may further validate against the return rules or policy the return information for the additional item to see if the additional item is still eligible for return.

In some embodiments, the return station may have the customer to stage onsite an item for return. For example, the customer may decide to return another item right before coming to the store for returning the selected item. In this scenario, the return station may allow the customer to generate return information onsite for another item. For example, upon verifying the customer identification, the return station may present a listing of products associated with the customer identification for the customer to select another item to return. Once another item is selected, the return station further validates the return by applying the rules for return eligibility via communicating with the RMM 108.

If the value of the item is low, or if the item is perishable, the customer may be offered to keep the item. Otherwise, the customer may be allowed to continue the returns process. Rules will determine how far the customer may proceed along the returns process. A minimal returns process may have the customer provide the transaction code (from the receipt), the product scan and a reason for returns. Rules may dictate that the process stop there and continue at the customer service desk in the store.

In some embodiments, the method 300 may be applied to product exchanges. When a customer drops off one item, a credit for that item may be kept. That is refund for the returned item may not be posted to a credit account or money account of the customer. Rather, the credit can be put on a "hold" status. The credit may be the monetary value of the item, or an "item" credit (the credit may be used for purchasing another item). When other item is purchased, the credit may be released and used towards the payment for other item. This credit may also be similar to certain gift card products that are to be used for specific items. Alternatively, the return of an item may be put on hold, and when a new item same as the item is purchased, the return of the item can be cancelled. That is, the new item is exchanged for the returned item.

Figure 4:
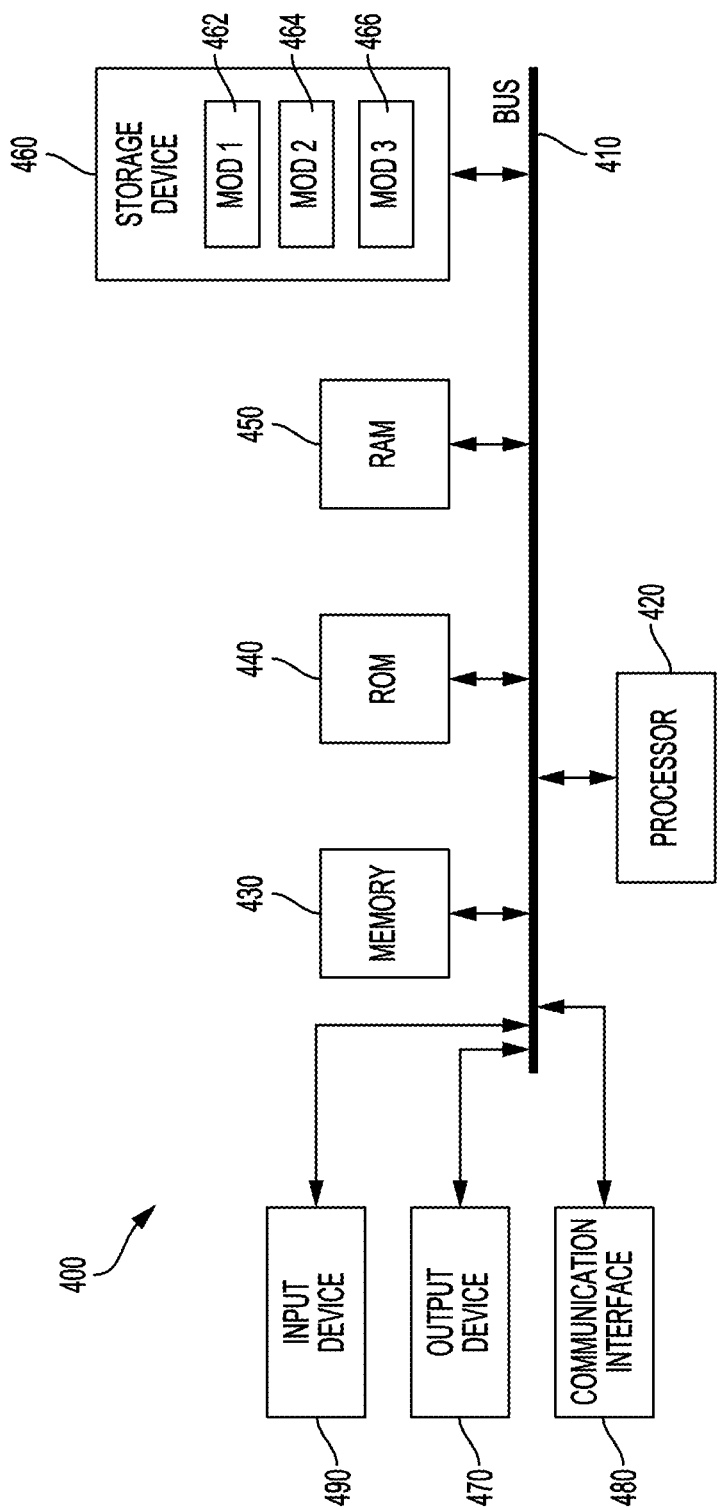
FIG. 4 illustrates an example computer system which can be used to implement the systems and methods for express return of products.

FIG. 4 illustrates an example computer system 400 which can be used to perform the systems for inventory monitoring as disclosed herein. The exemplary system 400 can include a processing unit (CPU or processor) 420 and a system bus 410 that couples various system components including the system memory 430 such as read only memory (ROM) 440 and random access memory (RAM) 450 to the processor 420. The system 400 can include a cache of high speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

Figure 5:
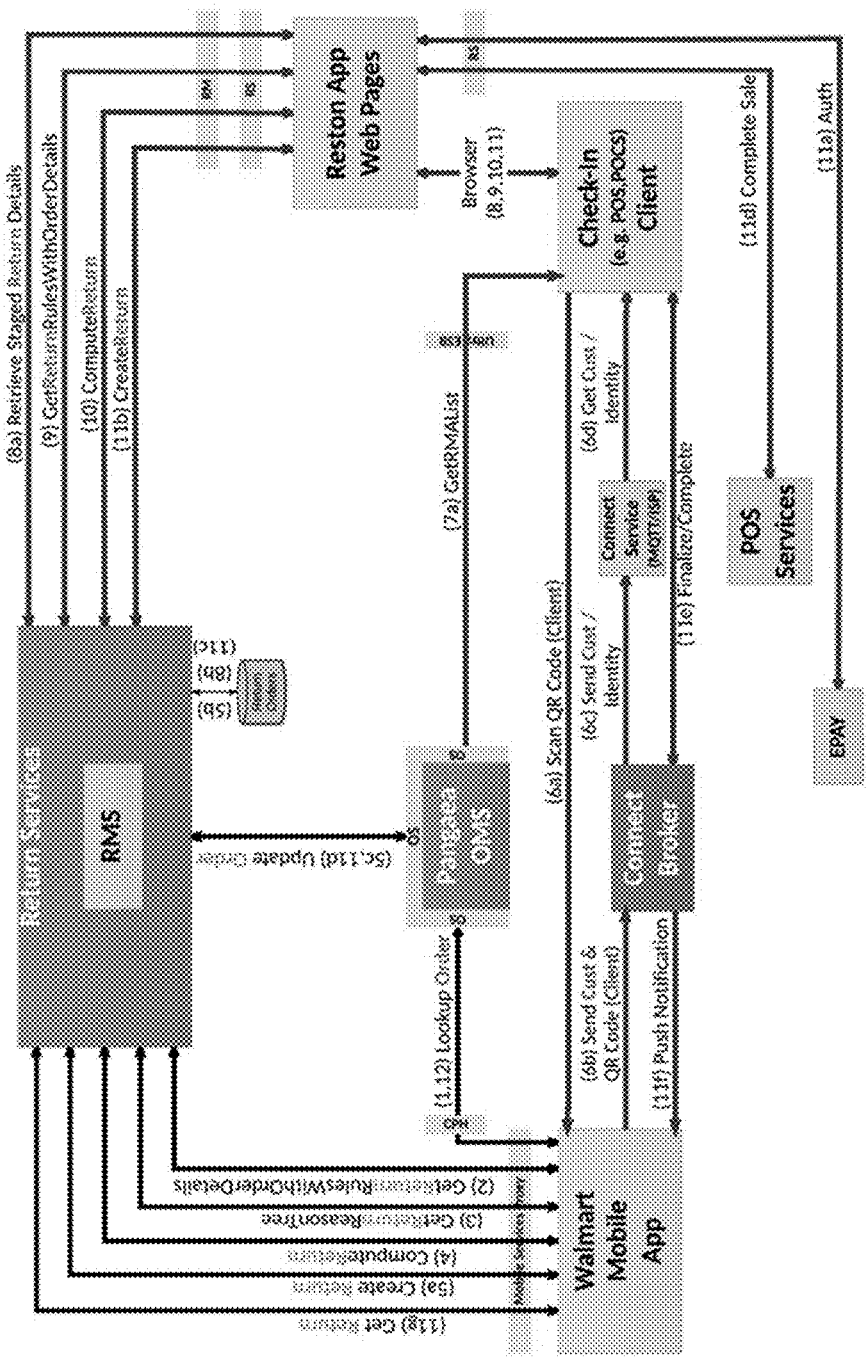
FIG. 5 illustrates a system for mobile-initiated express return of products according to one example embodiment.

FIG. 5 shows another exemplary system 500 for mobile-initiated in-store return of products according to one embodiment The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system for a mobile-initiated in-store product return of a purchased item through a mobile application based on scanning a code of the purchased item and an electronic receipt associated with the purchased item, the system comprising:
 a portable device having the mobile application installed thereon and configured to:
  launch the mobile application based on a customer identification;
  scan, via the mobile application, the code of the purchased item for the in-store product return, resulting in a scanned code;
  receive from a first database, via the mobile application, the electronic receipt of the purchased item, based on the scanned code;
  associate, via the mobile application, the electronic receipt with the purchased item;
  generate from a second database, via the mobile application, validating information associated with the in-store product return;
  save, via the mobile application, return information to the second database, the return information including at least one of the purchased item, the electronic receipt, or the validating information; and direct, via the mobile application, a customer associated with the validating information to a return location in a store,
a return station positioned in the return location in the store and configured to:
pair with the portable device;
receive the validation information;
print a return label to be placed on the purchased item; and
receive the purchased item with the return label attached, resulting in a labeled purchased item, and
a computing device associated with the first database and configured to:
receive an input indicative of receipt of the labeled purchased item; and
update the first database to indicate that the labeled purchased item is received,
wherein the portable device is further configured to:
receive, after updating the first database, a first notification indicating that the in-store product return is being processed; and
receive, after the in-store product return is finished, a second notification indicating that the in-store product return has been completed.

2. The system of claim 1, wherein the portable device includes a smartphone, a computing tablet, and a laptop computing device.

3. The system of claim 1, wherein receive the return information includes one of:
retrieve the return information from the second database; and
retrieve the return information from the portable device.

4. The system of claim 1, wherein the validation information include at least one of:
a reason for the in-store product return; and
a refund method.

5. The system of claim 1, wherein determine from the first database includes:
present a listing of products purchased by the customer;
select the purchased item for the in-store product return from the listing; and
validate the purchased item for return eligibility again a return policy.

6. The system of claim 1, wherein pair with the portable device is performed through one of: a quick response code, a near field communication, or a Bluetooth communication.

7. The system of claim 1, wherein direct a customer to a return location in a store includes one of:
detect, via the mobile application, a global positioning system position of the portable device; and
detect, via the mobile application, a network connection by the portable device to a local network in the store.

8. The system of claim 1, wherein the return station is further configured to:
retrieve, from the second database, additional return information for an additional purchased product to be returned by the customer; and
validate the additional purchased product for return eligibility against a return policy.

9. The system of claim 1, wherein the return station is further configured to issue a refund for the labeled purchased item to an account associated with the customer identification.

10. The system of claim 1, wherein the return station is further configured to:
receive a listing of products purchased associated with the customer identification;
select an additional purchased product for the in-store product return from the listing; and
validate the additional purchased product for return eligibility against a return policy.

11. A method implemented by a computer system for a mobile-initiated in-store product return of a purchased item through a mobile application based on scanning a code of the purchased item and an electronic receipt associated with the purchased item, the computer system comprising a portable device having the mobile application installed thereon, a return station positioned in a return location in a store and, and a computing device; and the method comprising:
launching the mobile application based on customer identification;
scanning, via the mobile application, the code of the purchased item for the in-store product return;
receiving from a first database, via the mobile application, the electronic receipt of the purchased item;
generating from a second database, via the mobile application, validating information associated with the in-store product return;
saving return information to the second database, the return information including at least one of the purchased item, the electronic receipt, or the validating information;
directing, via the mobile application, a customer associated with the validating information to the return location in the store;
pairing, via a near field communication connection, the portable device with the return station;
receiving, by the return station, the return information;
printing, by the return station, a return label to be placed on the purchased item;
receiving, by the return station, the purchased item with the return label affixed, resulting in a labeled purchased item;
receiving, by the computing device, an input indicative of receipt of the labeled purchased item;
updating the first database to indicate that the labeled purchased item is received,
receiving by the portable device, after updating the first database, a first notification indicating that the in-store product return is being processed; and
receiving by the portable device, after the in-store product return is finished, a second notification indicating that the in-store product return has been completed.

12. The method of claim 11, wherein receiving, by the return station, the return information includes one of:
retrieving the return information from the second database; and
retrieving the return information from the portable device.

13. The method of claim 11, wherein pairing the portable device with the return station is performed through one of: a quick response code, a near field communication, or a Bluetooth communication.

14. The method of claim 11, further comprising:
detecting, via the mobile application, a global positioning system position of the portable device; and
detecting, via the mobile application, a network connection by the portable device to a local network in the store.

15. The method of claim 11, further comprising:
retrieving, from the second database, additional return information for an additional purchased product to be returned by the customer; and
validating the additional purchased product for return eligibility against a return policy.

16. The method of claim 11, further comprising:
receiving a listing of products purchased associated with the customer;
selecting an additional purchased product for the in-store product return from the listing; and
validating the additional purchased product for return eligibility against a return policy.

\* \* \* \* \*